(12) United States Patent
Zaman et al.

(10) Patent No.: US 11,362,906 B2
(45) Date of Patent: Jun. 14, 2022

(54) TARGETED CONTENT SELECTION USING A FEDERATED LEARNING SYSTEM

(71) Applicant: Accenture Global Solutions Limited, Dublin (IE)

(72) Inventors: Md. Faisal Zaman, Drumcondra (IE); Hasan Samin Syed, Galway (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/948,452

(22) Filed: Sep. 18, 2020

(65) Prior Publication Data

US 2022/0094605 A1  Mar. 24, 2022

(51) Int. Cl.
| | |
|---|---|
| *H04L 12/24* | (2006.01) |
| *H04L 41/16* | (2022.01) |
| *G06N 20/00* | (2019.01) |
| *G06N 3/08* | (2006.01) |
| *H04L 41/082* | (2022.01) |
| *H04L 67/141* | (2022.01) |
| *H04L 67/50* | (2022.01) |
| *H04L 67/01* | (2022.01) |

(52) U.S. Cl.
CPC ............... *H04L 41/16* (2013.01); *G06N 3/08* (2013.01); *G06N 20/00* (2019.01); *H04L 41/082* (2013.01); *H04L 67/141* (2013.01); *H04L 67/22* (2013.01); *H04L 67/42* (2013.01)

(58) Field of Classification Search
CPC ......... H04L 41/16; H04L 67/42; H04L 67/22; H04L 41/082; H04L 67/141; G06N 3/08; G06N 20/00
See application file for complete search history.

(56) References Cited

U.S. PATENT DOCUMENTS

| | | | |
|---|---|---|---|
| 6,281,893 B1* | 8/2001 | Goldstein | G06F 9/452 715/733 |
| 10,643,749 B1* | 5/2020 | Warner | G16H 40/20 |
| 2003/0149737 A1* | 8/2003 | Lambert | H04L 43/00 709/214 |
| 2008/0003964 A1* | 1/2008 | Alperin | H04M 3/5233 455/185.1 |
| 2009/0112586 A1* | 4/2009 | Williams | G10L 15/01 704/239 |
| 2012/0096070 A1* | 4/2012 | Bryzak | H04L 67/02 709/203 |

(Continued)

*Primary Examiner* — Michael Won
(74) *Attorney, Agent, or Firm* — Harrity & Harrity, LLP

(57) ABSTRACT

A device may obtain configuration data for a server-side model. The device may generate synthetic usage data based on the configuration data. The device may train the server-side model based on the synthetic usage data. The device may determine update data based on the trained server-side model. The device may provide, to a client device, a message that includes the update data. The message may be configured to cause the client device to train a client-side model based on the update data and historical user data associated with the client device. The device may receive, from the client device, the client-side model data and may select content data based on the client-side model data and the trained server-side model. The device may provide the content data to the client device to permit the client device to provide content that is associated with the content data.

24 Claims, 9 Drawing Sheets

(56) References Cited

U.S. PATENT DOCUMENTS

| | | | |
|---|---|---|---|
| 2012/0158685 A1* | 6/2012 | White | G06F 16/9535 |
| | | | 707/706 |
| 2012/0191865 A1* | 7/2012 | Duff | H04L 67/32 |
| | | | 709/228 |
| 2012/0284212 A1* | 11/2012 | Lin | G06N 20/00 |
| | | | 706/12 |
| 2014/0201180 A1* | 7/2014 | Fatourechi | G06F 16/48 |
| | | | 707/706 |
| 2014/0244191 A1* | 8/2014 | Oka | G06F 1/3206 |
| | | | 702/61 |
| 2014/0330548 A1* | 11/2014 | Appel | G06Q 30/0201 |
| | | | 703/6 |
| 2015/0363688 A1* | 12/2015 | Gao | G06F 16/9032 |
| | | | 706/27 |
| 2016/0188762 A1* | 6/2016 | Warrier | G06Q 10/06 |
| | | | 703/21 |
| 2016/0357424 A1* | 12/2016 | Pang | H04L 61/2007 |
| 2017/0031904 A1* | 2/2017 | Legrand | G06F 16/34 |
| 2017/0132230 A1* | 5/2017 | Muralidhar | G06F 16/9535 |
| 2017/0330109 A1* | 11/2017 | Maughan | G06N 5/04 |
| 2018/0048532 A1* | 2/2018 | Poort | H04L 41/147 |
| 2018/0232245 A1* | 8/2018 | Aseev | G06F 8/30 |
| 2018/0365253 A1* | 12/2018 | Francis | G06F 16/958 |
| 2019/0005021 A1* | 1/2019 | Miller | G10L 15/26 |
| 2019/0138901 A1* | 5/2019 | Meyer | G06N 3/04 |
| 2019/0354809 A1* | 11/2019 | Ralhan | G06K 9/6264 |
| 2019/0371192 A1* | 12/2019 | Chandra | G06F 16/743 |
| 2021/0056436 A1* | 2/2021 | Shah | G06N 5/02 |
| 2021/0216845 A1* | 7/2021 | Walters | G06F 16/9535 |
| 2021/0275911 A1* | 9/2021 | Padmanabhan | G06F 40/30 |

* cited by examiner

TARGETED CONTENT SELECTION USING A FEDERATED LEARNING SYSTEM

BACKGROUND

Federated learning is a machine learning technique that trains an algorithm across multiple decentralized devices. The decentralized devices may utilize locally stored training data that is not exchanged between the devices.

SUMMARY

In some implementations, a method includes obtaining, by a server, model configuration data for a server-side model; generating, by the server, synthetic usage data based on the model configuration data; training, by the server, the server-side model based on the synthetic usage data; determining, by the server, model update data based on the trained server-side model; providing, by the server and to a client device, a model update message that includes the model update data, wherein the model update message is configured to cause the client device to: train a client-side model based on the model update data and historical user data associated with the client device, and use the trained client-side model to determine client-side model data based on a user session of an application of the client device; receiving, by the server and from the client device, the client-side model data; selecting, by the server, content data based on the client-side model data and the trained server-side model; and providing, by the server, the content data to the client device to permit the client device to provide, in association with the user session, content that is associated with the content data.

In some implementations, a client device includes one or more memories; and one or more processors, communicatively coupled to the one or more memories, configured to: receive, from a server, a model update message that includes model update data associated with a server-side model, wherein the server is associated with an application of the client device; train a client-side model based on the model update data and historical user data associated with the client device; obtain session data associated with a user session of the application; generate, using the trained client-side model, client-side model data based on the session data, wherein the client-side model data is associated with weight settings of a machine learning model of the client-side model; and perform an action associated with providing content for the user session based on the client-side model data.

In some implementations, a non-transitory computer-readable medium storing a set of instructions includes one or more instructions that, when executed by one or more processors of a server, cause the server to: obtain model update data associated with a server-side model; provide the model update data to a client device, wherein the model update data is configured to cause the client device to: train a client-side model based on the model update data and historical user data associated with the client device, and use the trained client-side model to determine client-side model data based on session data associated with an application of the client device; receive, from the client device, the client-side model data, wherein the client-side model data is associated with weight settings of a machine learning model of the client-side model; select content data for the user session based on the weight settings and the server-side model; and provide the content data to the client device to permit the client device to output content that is associated with the content data.

In some implementations, a server device includes one or more memories; and one or more processors, communicatively coupled to the one or more memories, configured to: obtain model configuration data for a server-side model; generate synthetic usage data based on the model configuration data; train the server-side model based on the synthetic usage data and to generate a trained server-side model; determine model update data based on the trained server-side model; provide, to a client device, a model update message that includes the model update data, wherein the model update message is configured to cause the client device to: train, based on the model update data and historical user data associated with the client device, a client-side model to generate a trained client-side model, and use the trained client-side model to determine client-side model data based on a user session of an application of the client device; receive, from the client device, the client-side model data; select content data based on the client-side model data and the trained server-side model; and provide the content data to the client device to permit the client device to provide, in association with the user session, content that is associated with the content data.

DETAILED DESCRIPTION

Figure 1A:
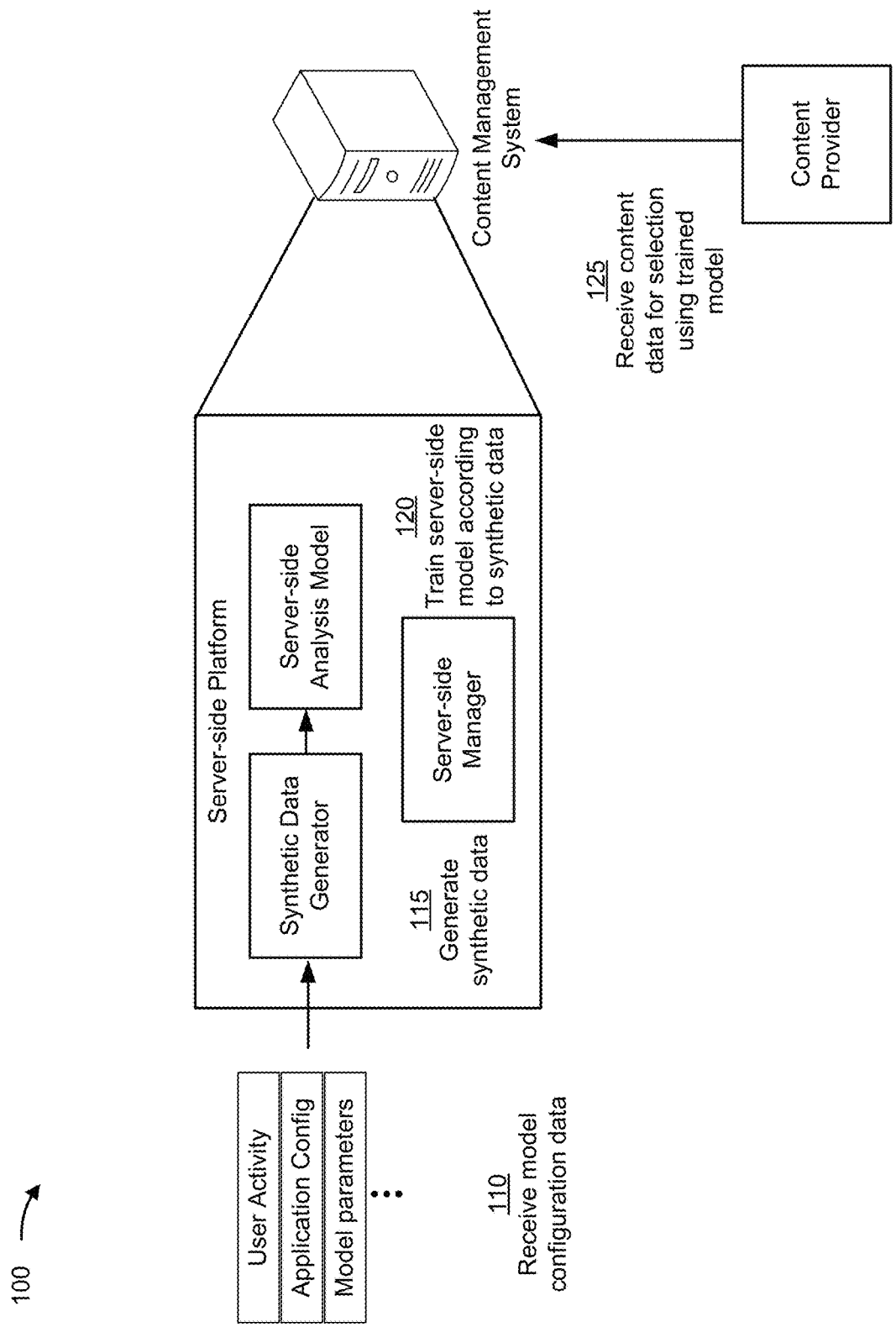
FIGS. 1A-1C and 2 are diagrams of an example implementation described herein.

The following detailed description of example implementations refers to the accompanying drawings. The same reference numbers in different drawings may identify the same or similar elements.

An entity may collect data obtained by a client device, such as measurements, photos, videos, personal information associated with a user of the client device, location information, and/or the like. The entity may use the collected data to determine relevant content (e.g., advertisements, suggested web pages, and/or the like) to be delivered to the user via the client device. For example, the entity may utilize a machine learning model to process the data to determine the relevant content.

To protect the privacy of the user, the personal information associated with the user of may be omitted from the collected data or the collected data may be encrypted. However, removing the personal information associated with the user may limit the ability of the machine learning model to determine relevant content for the user. Further, encrypting the collected data may degrade a quality of the data. For example, encrypting the data using an algorithm such as a private stochastic gradient descent algorithm causes noise to be added to various data points in the collected data. The addition of the noise may reduce an amount of accuracy gained by adding the personal information associated with the user to the collected data.

In some cases, the user may consent to the collection and/or processing of the data by a third-party. The third-party may be unrelated to a website the user is visiting, an application the user is using, and/or the like. For example, a user may download an application to a client device. To access the application, the user may consent to a terms of use agreement provided by a developer of the application. The terms of use agreement may specify that the user consents to the collection and processing of data associated with the user by a third-party. The user may not be able to control or limit the third-party's access to the data, thereby preventing the user from being able to control the use of the user's personal information.

Some implementations described herein relate to a content management system that utilizes a federated learning system to identify content relevant to a user without requiring data associated with the user to be shared with other devices included in the federated learning system. The content management system may obtain configuration data for a server-side model. The content management system may generate synthetic usage data based on the configuration data. The content management system may train the server-side model based on the synthetic usage data. The content management system may determine update data based on the trained server-side model. The content management system may provide, to a client device, a message that includes the update data. The message may be configured to cause the client device to train a client-side model based on the update data and historical user data associated with the client device.

The content management system may receive, from the client device, client-side model data. The client-side model data may include information identifying a set of weights utilized by the client-side model to process the update data and the historical usage data. The content management system may configure the server-side model based on the weights. The server-side model may process the synthetic usage data to generate an output. The content management system may select content data based on the output of the server-side model. The device may provide the content data to the client device to permit the client device to provide content that is associated with the content data.

In this way, the client device may provide relevant content to the user without sharing personal information associated with the user. Further, transmitting the client-side model data may consume fewer computing resources (e.g., processing resources, memory resources, communication resources, and/or the like) relative to transmitting encrypted user data based on the size of the client-side model data being less than a size of the encrypted user data.

Figure 1B:
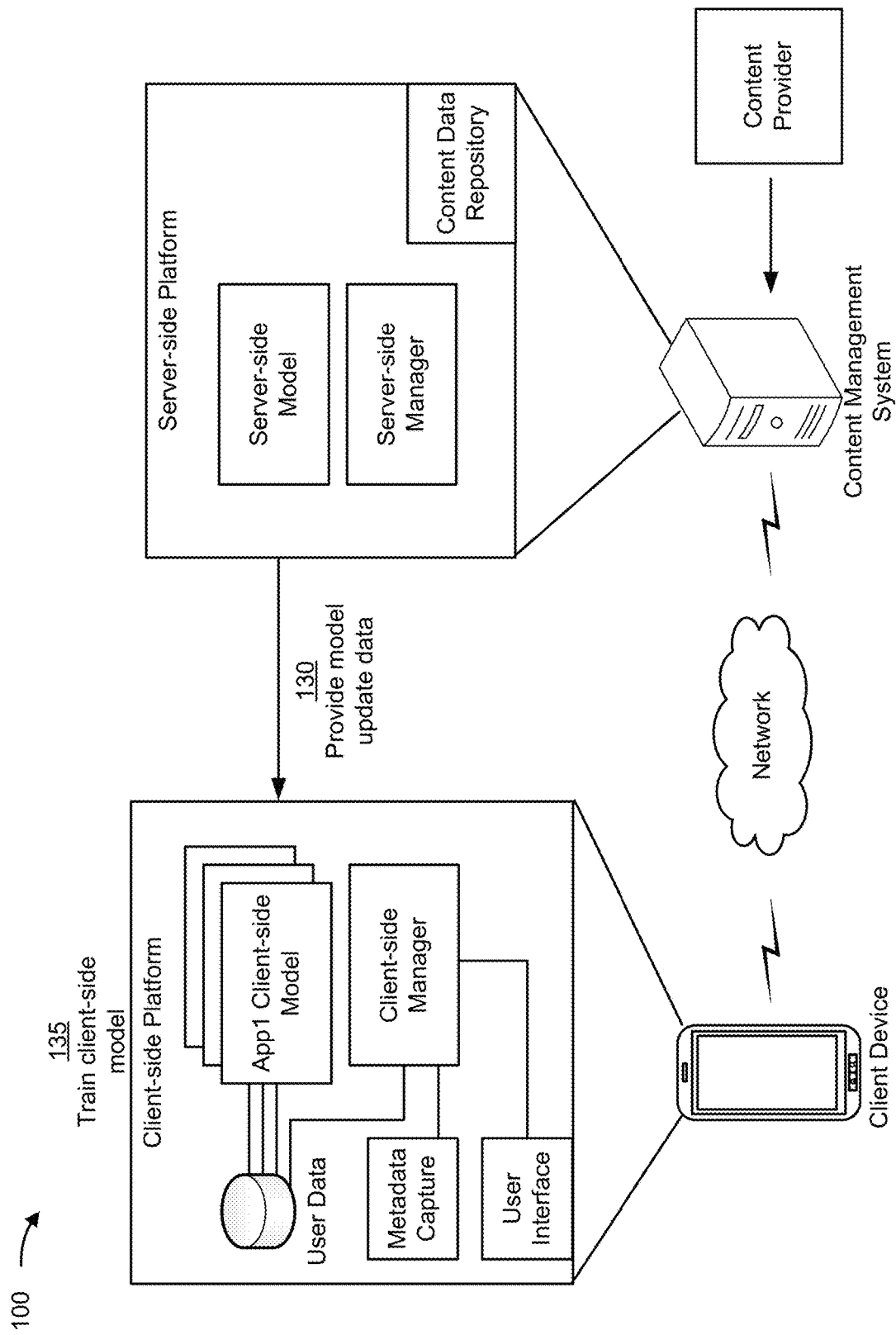
Figure 1C:
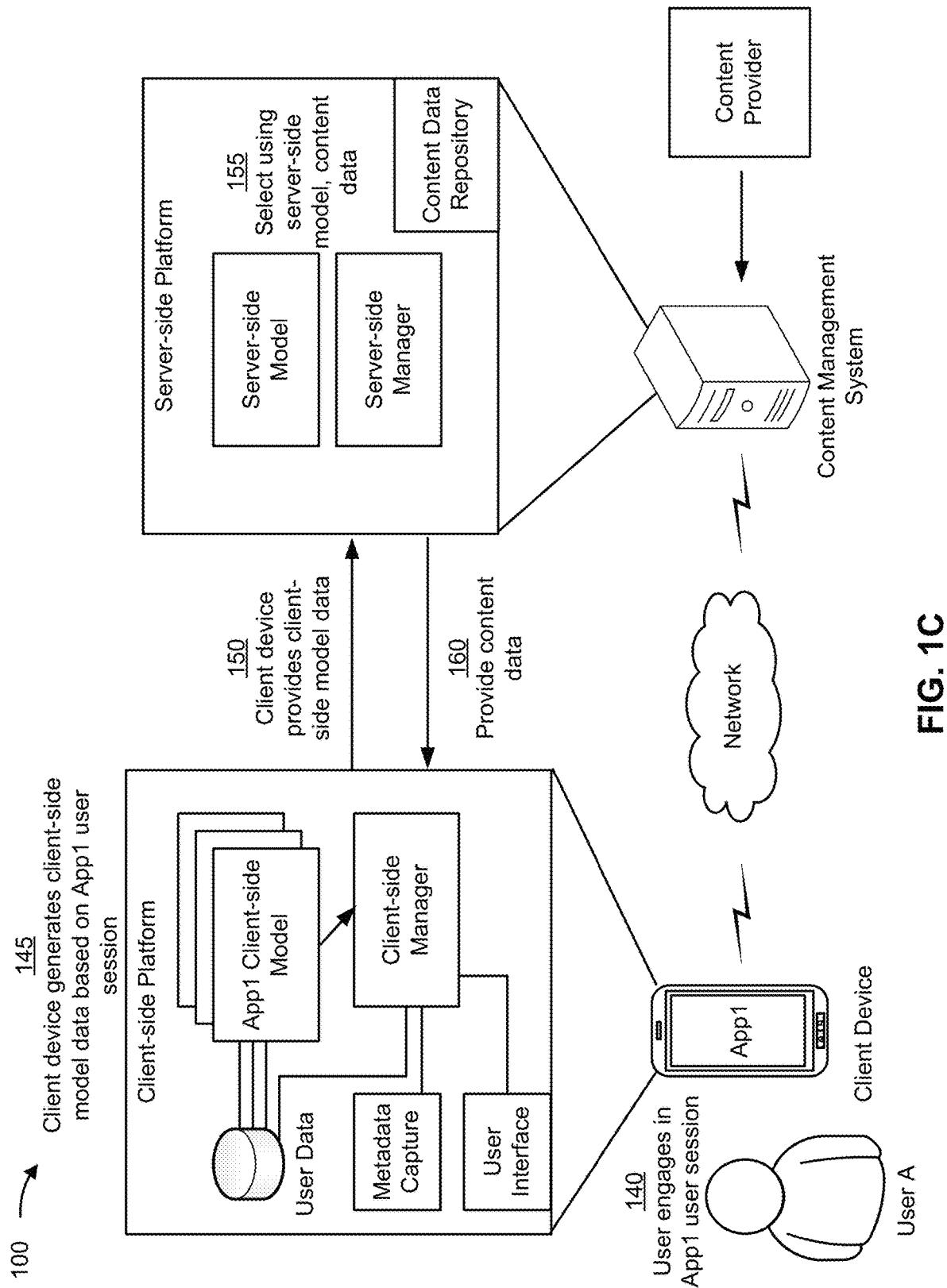

FIGS. 1A-1C are diagrams of one or more example implementations 100 described herein. As shown in FIGS. 1A-1C, a client device (shown in FIGS. 1B and 1C) may be associated with a content management system and a content provider platform. The client device may include one or more devices capable of receiving, generating, storing, processing, and/or providing information associated with selecting targeted content, as described elsewhere herein. The client device may include a communication device and/or a computing device. For example, the client device may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device.

The client device may include a client-side manager (shown in FIGS. 1B and 1C) that manages a group of client-side models associated with a group of applications installed on the client device. A client-side model, of the group of client-side models may be associated with an application and may determine content to be provided to the user based on user data and metadata associated with a user of the client device and obtained by the client-side manager.

The content management system may include one or more devices capable of receiving, generating, storing, processing, and/or providing information associated with selecting targeted content, as described elsewhere herein. The content management system may include a communication device and/or a computing device. For example, the content management system may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The content management system may include a server-side manager (shown in FIGS. 1B and 1C) that receives client-side model data from the client device and utilizes a server-side model to determine content to be provided to a user of the client device, as described in greater detail below.

The content provider platform may include one or more devices capable of receiving, generating, storing, processing, and/or providing content to the content management system. The content provider platform may include a communication device and/or a computing device. For example, the content provider platform may include a server, an application server, a client server, a web server, a database server, a host server, a proxy server, a virtual server (e.g., executing on computing hardware), a server in a cloud computing system, a device that includes computing hardware used in a cloud computing environment, or a similar type of device.

The content management system may maintain a group of server-side models. A server-side model, of the group of server-side models, may be associated with a particular application and may be configured to process usage data to determine relevant content to provide to a user via the particular application.

As shown in FIG. 1A, and by reference number 110, the content management system receives model configuration data for a server-side model. The model configuration data may include user exception testing data. In some implementations, the user exception testing data includes usage data associated with a user utilizing an application during development and/or testing of the application. For example, the user exception data may include user activity information, application configuration information, and model parameter information.

The user activity information may include information associated with a user accessing and/or using the application. For example, the user activity information may include information associated with actions performed by the user while using the application, such as a feature accessed by the user, data input by the user, a user interface accessed by the user, an action performed by the application in response to a user input, and/or the like. Alternatively, and/or additionally, the user activity information may include information identifying a location of the user (e.g., a location of a client device executing the application) while accessing the application, a time of day when the user accessed the application, an application accessed prior to using the application, an application accessed after using the application, and/or the like.

The application configuration information may include information identifying a configuration setting of the application. For example, the application configuration information may include information identifying a display setting, a volume setting, a notification setting (e.g., whether the application is allowed to provide notifications to the user when the user is not using the application), a device setting (e.g., whether the application is allowed to access a component of the client device, such as a microphone, a camera, and/or the like), whether the application is allowed to access particular information (e.g., contacts, a calendar, documents, information obtained or generated by another application, and/or the like), a component of the client device (e.g., a microphone, a camera, and/or the like), and/or the like), and/or the like.

The model parameter information may include information associated with one or more parameters of the server-side model. For example, the model parameter information may include information identifying an application with which the server-side model is associated, a machine learning algorithm utilized by the server-side model, information identifying a set of weights to be utilized by the server-side model, and/or the like.

In some implementations, the model configuration data is associated with a particular application. For example, the model configuration data may include user exception testing data that includes usage data associated with a user utilizing the particular application during development and/or testing of the particular application, user activity information that includes information associated with a user accessing and/or using the application, and/or the like.

In some implementations, the model configuration data is associated with a group of applications. For example, the model configuration data may include user exception testing data that includes usage data associated with one or more users utilizing the group of applications during development and/or testing of the group of applications. In some implementations, the group of applications may be associated with the same developer, distributer, manufacturer, and/or the like. The content management system may identify an application, of the group of applications, associated with a portion of the model configuration data and may use the portion of the model configuration data to train a server-side model associated with the application, as described in greater detail below.

As shown by reference number 115, the content management system generates synthetic data. The synthetic data may include synthetic usage data that is generated based on simulating user behaviors associated with a user using an application. For example, the synthetic usage data may be generated based on utilizing an automated software testing tool to simulate one or more user sessions associated with a user utilizing the application. The one or more simulated user sessions may be simulated based on the user activity data included in the model configuration data.

As an example, the content management system may identify a series of steps or actions performed by a user while using the application based on the user activity data. The content management system may utilize an automated software testing tool to simulate a user performing the series of steps or actions to generate the synthetic data. In some implementations, the content management system may modify the series of steps or actions and generate the synthetic data based on the modified series of steps or actions. In some implementations, the content management system supplements the synthetic data with user activity data included in the model configuration data.

In this way, the content management system may generate data for training the server-side model. Using the data to train the server-side model may improve an accuracy of the server-side model associated with identifying relevant content for a user. Accordingly, the content management system may conserve computing resources associated with identifying, obtaining, and/or generating actual usage data to train the server-side model relative to other systems for identifying, obtaining, and/or generating usage data for training the server-side model.

As shown by reference number 120, the content management system trains the server-side model according to the synthetic data. The server-side model may comprise a machine learning model that modifies a set of variables used in a machine learning algorithm for processing input data. For example, the server-side model may be a neural network model, a convolutional neural network model, a linear regression model, a classification model, and/or the like.

The content management system may identify an application associated with the server-side model. The content management system may obtain synthetic data associated with the application. The content management system may utilize the synthetic data associated with the application to train the server-side model to determine content relative to users of the application. The server-side model may be trained to determine content relevant to a user and a confidence score that reflects a measure of confidence that the content is relevant to the user. In some implementations, the content management system trains the server-side model in a manner similar to that described below with respect to FIG. 3. Alternatively, and/or additionally, the content management system may obtain a trained server-side model from another device.

As shown by reference number 125, the content management system receives content data for selection using the trained server-side model. The content data may include content (e.g., advertisements, news articles, public service announcements, and/or the like), information for obtaining content (e.g., a uniform resource locator (URL), an address of a device storing the content, and/or the like), information identifying a type of the content (e.g., audio content, video content, image content, text content, and/or the like), information identifying a classification associated with the content (e.g., sports, entertainment, news, public service announcement), information identifying a geographic location associated with the content (e.g., a city, a region, a state, and/or the like), information identifying a setting associated with the content (e.g., home, work, sporting event, and/or the like), information identifying a date or time associated with the content (e.g., a date on which the content may be provided, a time of day at which the content may be provided, and/or the like), and/or the like. The above-listed content data are intended to be merely examples of types of content data that may be used. The content data described above is representative of, and not exclusive of, content data.

The content management system may receive the content data periodically (e.g., hourly, daily, weekly, and/or the like), based on sending a request for the content data to the content provider platform, based on an occurrence of an event (e.g., training the server-side model, a user downloading an application to a client device, the user accessing the application via the client device, and/or the like), and/or the like.

The content management system may determine an application associated with the content data. For example, the content data may include information identifying an application with which the content data is associated. The content management system may determine that the content data is associated with the application based on the information identifying the application. The content management system may store the content data and/or information indicating the application associated with the content data in a data structure (e.g., a database, a table, a list, and/or the like) stored in a memory associated with the content management system.

As shown in FIG. 1B, and by reference number 130, the content management system provides model update data to a client device. The model update data may include information associated with the trained server-side model. For example, the model update data may include information identifying an application associated with the server-side model, information identifying a machine learning algorithm utilized by the server-side model, information identifying a set of variables learned by the trained server-side model, and/or the like.

In some implementations, the server-side model includes a neural network model, and the set of variables learned by the trained server-side model includes a set of weights. In some implementations, the server-side model includes a linear regression model, and the set of variables learned by the trained server-side model includes a set of coefficients. In some implementations, the server-side model includes a decision tree model (e.g., a classification model), and the set of variables learned by the trained server-side model includes a sequence of rules used to classify input data.

In some implementations, the content management system may periodically (e.g., hourly, daily, weekly, and/or the like) provide the model update data to the client device. Alternatively, and/or additionally, the content management system may provide the model update data to the client device based on training the server-side model, based on the client device downloading an application associated with the server-side model, based on receiving a request from the client device, and/or the like.

As shown by reference number 135, the client device trains a client-side model based on the model update data. The client device may receive the model update data and may identify an application associated with the model update data. The client device may identify a client-side model associated with the application. The client-side model may correspond to the server-side model. For example, the client-side model and the server-side model may be the same type of model, may utilize the same machine learning algorithm to process input data, and/or the like.

In some implementations, the client device generates the client-side model. For example, the client device may determine that an application is installed on the client device. The client device may generate the client-side model based on the application being installed on the client device.

In some implementations, the client device obtains the client-side model from another device. For example, the client device may obtain the client-side model from the content management system. In some implementations, the client device is included in the model update data. Alternatively, and/or additionally, the client device may request the client-side model from the content management system. For example, the client device may request the client-side model from the content management system based on receiving the model update data.

As another example, the client device may obtain the client-side model based on obtaining the application. For example, a user may utilize the client device to download an application from a server device associated with an application provider. The client device may obtain the client-side model from the server device and/or from the content management system based on downloading the application from the server device.

In some implementations, the client device trains the client-side model based on the model update data. The client device may identify values of the set of variables utilized by the server-side model based on information included in the model update data. The client device may configure a set of corresponding variables of the client-side model based on the values the set of variables utilized by the server-side model.

In some implementations, the client device trains the client-side model based on user data and/or metadata associated with a user of the client device. The user data may include information associated with a user of the client device, such as a gender of the user, an age of the user, a marital status of the user, an interest of the user (e.g., a favorite sports team, a hobby, and/or the like), whether the user has any children, an age of a child of the user, and/or the like.

In some implementations, the metadata includes contextual information associated with the user's use of the client device. For example, the metadata may include information identifying an application used by the user, a time that the application was used by the user, a length of time for which the user used the application, an action performed by the user while using the application, a location of the user while using the application (e.g., at home, at work, in the car, and/or the like), a weather condition at the time the user used the application (e.g., sunny, raining, snowing, and/or the like), an application used prior to the user using the application, an application used after the user used the application, content provided to the user while the user used the application, an action taken by the user based on the content being provided (e.g., clicked on a link in an advertisement, closed the advertisement, stopped using the application, and/or the like), and/or the like. Alternatively, and/or additionally, the metadata may include information identifying a frequently visited location, content viewed by the user, an item purchased by the user, a website visited by the user, content determined to be relevant to the user by another client-side model associated with another application, and/or the like.

The client device may train the client-side model based on configuring the set of variables of the client-side model, the user data, and the metadata. The content management system may train the client-side model to process user data and metadata associated with the user to identify content relevant to the content and a confidence score that reflects a measure of confidence that the content is relevant to the user. In some implementations, the client device trains the client-side model in a manner similar to that described below with respect to FIG. 3.

As shown in FIG. 1C, and by reference number 140, a user (e.g., User A, as shown in FIG. 1C) engages in an application user session. As an example, the user may utilize the client device to use an application (e.g., Appl, as shown in FIG. 1C). The client device may establish an application user session and may determine that content is to be provided to the user via the application based on the user using the application. For example, the client device may determine that content is to be provided to the user via the application based on information stored in a data structure, based on a notification provided by the application, and/or based on a request for content received from the application. The client device may determine whether to utilize the client-side model or the server-side model to determine the content to be provided to the user based on determining that content is to be provided to the user, as described below with respect to FIG. 2.

In some implementations, the client device utilizes the client-side model to determine the content. The client device may obtain user data and/or metadata associated with the application user session. The client device may provide the user data and/or the metadata associated with the application user session as inputs to the client-side model. The client-side model may process the user data and/or the metadata and may generate an output indicating content relevant to the user.

In some implementations, the output may include information identifying the content. For example, the output may include an identifier associated with the content, an address (e.g., a memory address, an IP address, and/or the like) at which the content is stored, and/or the like. The client device may obtain the content based on the information identifying the content and may provide the content to the application to enable the application to provide the content to the user.

In some implementations, the output may include information identifying a type of the content (e.g., an advertisement, a news article, a public service announcement, and/or the like), a format of the content (e.g., audio, video, text, and/or the like), a topic associated with the content (e.g., a type of product and/or service, a sporting event, a sports team, and/or the like), an entity associated with the content (e.g., a manufacturer, a business, a person, and/or the like), and/or the like. The client device may obtain the content based on the information included in the output.

In some implementations, the client device obtains the content from a memory of the client device. For example, the client device may obtain a plurality of content from the content management system and may store the plurality of content in a memory of the client device. The client device may select content, from the plurality of content, based on the information included in the output.

In some implementations, the client device obtains the content from another device, such as the content management system, an entity associated with the application and/or the client device (e.g., a distributor, a developer, a manufacturer, and/or the like), and/or the like. The other device may be a trusted device thereby ensuring that the client-side model data is transmitted via a trusted communication channel.

The client device may provide information included in the output to the other device. The other device may receive the output and may select the content, from a plurality of content, based on the information included in the output. The other device may provide the selected content to the client device. The client device may receive the content and may provide the content to the application to cause the application to provide the content to the user.

In some implementations, the client device determines to utilize the server-side model to determine the content to be provided to the user. As shown in FIG. 1C, and by reference number 145, the content management system generates client-side model data based on an application user session. The client-side model data may include information identifying the client device, information identifying an application associated with the application user session, information identifying a type of the client-side model, information identifying a machine learning algorithm utilized by the client-side model, information identifying values of the set of variables of the trained client-side model, and/or the like.

The client-side model data may not include user data or any other type of personal information associated with the user. In this way, the client device may ensure that personal information associated with the user is not shared with another device. Further, because the client-side model data does not include personal information associated with the user, the client device may not encrypt the client-side model data. By not encrypting the client-side model data, the client device may reduce a size of the data transmitted by the client device thereby conserving computing resources that otherwise would have been utilized to transmit the encrypted client-side model data.

As shown by reference number 150, the client device provides the client-side model data to the content management system. The content management system may receive the client-side model data. The content management system may select, based on the client-side model data, a server-side model, from a plurality of server-side models, to determine the content. In some implementations, the content management system selects the server-side model based on an application associated with the client-side model data. For example, the client-side model data may include information identifying the application used by the user. The content management system may identify a server-side model, of the plurality of server-side models, associated with the application used by the user. Alternatively, and/or additionally, the content management system may utilize a machine learning model to select the server-side model, as described in greater detail below with respect to FIG. 2.

The content management system may analyze the client-side model data and may determine the values of the set of variables of the client-side model based on the analysis. The content management system may modify the values of the set of variables of the server-side model based on the values of the set of variables of the client-side model.

In some implementations, the content management system modifies the values of the set of variables of the server-side model to correspond to the values of the set of variables of the client-side model. In some implementations, the content management system determines values of a plurality of sets of variables for a plurality of client-side models, including the client-side model of the client device. The plurality of client-side models may be associated with the application being used by the user. The content management system may identify a server-side model, from a plurality of server-side models, associated with the application. The content management system may modify the values of the set of variables of the identified server-side model based on the values of the plurality of sets of variables. For example, the content management system may determine an average value of a variable included in the plurality of sets of variables and may modify a corresponding variable of the server-side model based on the average value.

As shown by reference number 155, the content management system may select, using the client-side model, content data. The content management system may provide the synthetic usage data to the server-side model as an input based on modifying the set of variables of the server-side model. The server-side model may analyze the synthetic usage data to generate an output. The content management system may select the content data from the content data stored in the memory associated with the content management system (e.g., from content data stored in a content data repository, as shown in FIG. 1C).

As shown by reference number 160, the content management system provides the content data to the client device. The client device may receive the content data and may obtain the content based on the content data. In some implementations, the content is included in the content data and the client device obtains the content from the content data. Alternatively, and/or additionally, the content data includes information for obtaining the content (e.g., from a memory of the client device, from a server device storing content, and/or the like). For example, the content data may include a unique identifier associated with the content, an address (e.g., a URL, a memory address, an IP address, and/or the like) of a device storing the content, and/or the like. The client device may obtain the content and may provide the content to the application to enable the application to provide the content to the user.

In some implementations, the client device obtains feedback information associated with providing content to the user. The feedback information may include information identifying an action performed by the user based on receiving the content (e.g., clicking on a link included in the content, closing the content, closing the application, and/or the like), information provided by the user in response to a query provided via the application (e.g., a pop-up window asking the user to rate a relevancy of the content), an action performed by the user based on receiving other content via the application and/or via another application, information provided by the user in response to a query provided via the application and/or other application based on providing the other content, and/or the like. The client device may retrain the client-side model based on the feedback. For example, the client device may add the user data and the metadata used to determine the content and the feedback in a set of training data used to train the client-side model to generate modified training data. The client device may utilize the modified training data to retrain the client-side model in a manner similar to that described below with respect to FIG. 3.

Retraining the client-side model may cause the values of the set of variables of the client-side model to change. The client device may provide updated client-side model data that include information identifying the new values of the set of variables to the content management system. The content management system may receive the updated client-side model data and may modify the values of the set of variables of the server-side model based on the updated client-side model data, in a manner similar to that described above. In some implementations, the client device provides the updated client-side model data based on retraining the client-side model. Alternatively, and/or additionally, the client device provides the updated model data to the content management system based on determining that additional content is to be provided to the user (e.g., when the user uses another application, after a period of time since providing the initial content to the user, and/or the like). In this way, the server-side model may continue to learn to determine relevant content for the user without personal information associated with the user being provided to the content management system.

In some implementations, the client device utilizes the modified training data to retrain a group of client-side models. For example, the client device may identify a group of client-side models associated with applications associated with the same developer, manufacturer, distributor, and/or the like. The client device may utilize the modified training data to retrain the group of client-side models based on the group of client-side models being associated with the same developer, manufacturer, distributor, and/or the like.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
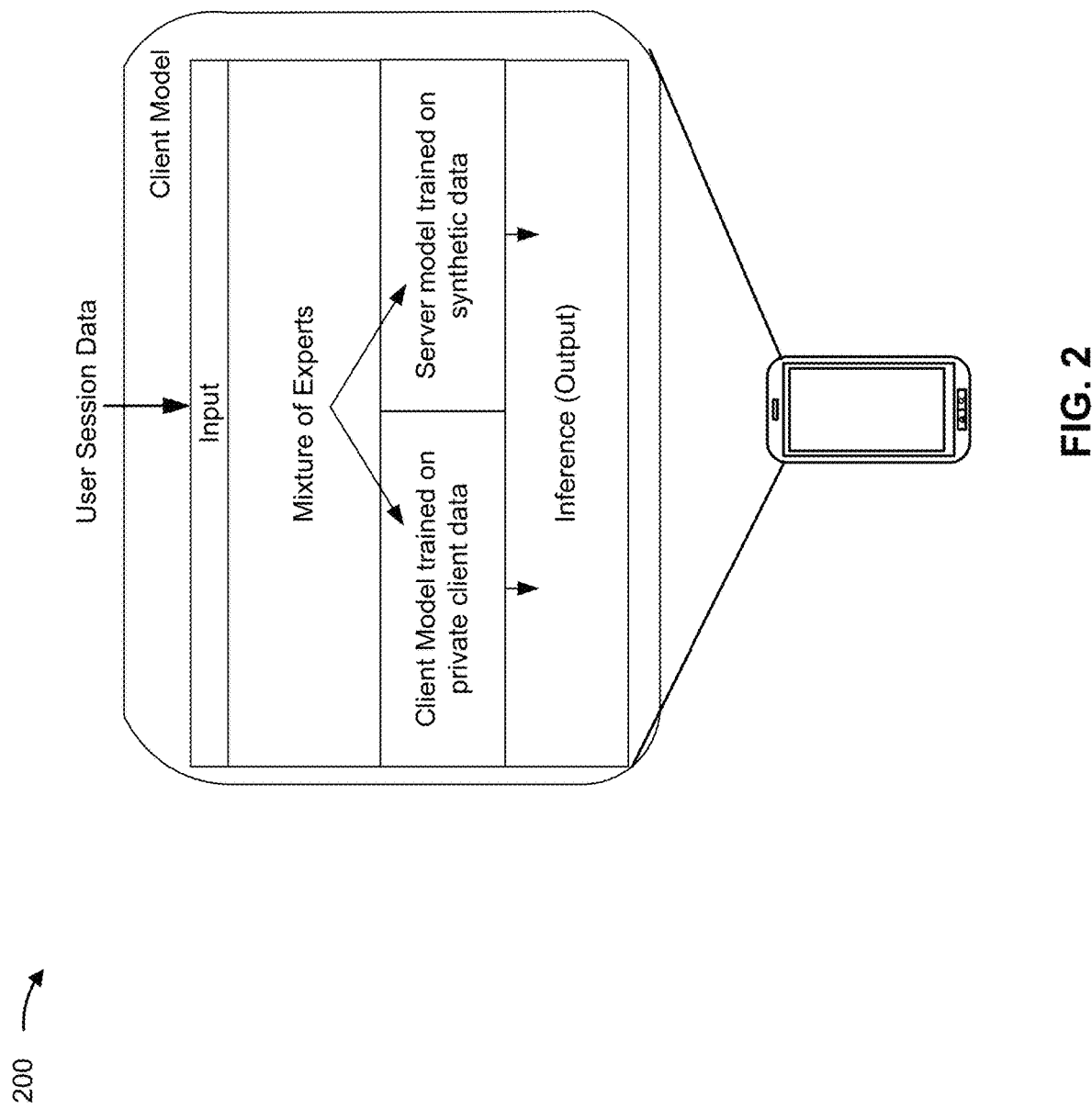

FIG. 2 is a diagram of an example implementation 200 described herein. As shown in FIG. 2, a client device utilizes a machine learning model (e.g., a mixture of experts model, as shown in FIG. 2) to determine whether to utilize the client-side model or the server-side model to determine content to be provided to a user. The machine learning model may analyze information associated with the application user session (e.g., user data, metadata, and/or the like) to generate an output. For example, the machine learning model may comprise a mixture of experts model that utilizes a gating network to analyze the information associated with the application session to generate an output indicating whether to use the client-side model or the server-side model to determine the content.

In some implementations, the output may include information identifying a first score (e.g., a confidence score, an accuracy, and/or the like) associated with utilizing the client-side model to determine the content. The client device may determine whether the first score satisfies a threshold score. The client device may determine to utilize the client-side model when the first score satisfies the threshold score.

In some implementations, the output includes information identifying a second score associated with utilizing the server-side model to determine the content. The client device may determine whether the second score satisfies the threshold score. The client device may determine utilize the server-side model to determine the content when the second score satisfies the threshold score. Alternatively, and/or additionally, the client device may determine to utilize the server-side model to determine the content when the first score fails to satisfy the threshold score.

In some implementations, the output includes information identifying the client-side model or the server-side model. The client device may determine to utilize the client-side model to determine the content when the output includes information identifying the client-side model. The client device may determine to utilize the server-side model to determine the content when the output includes information identifying the server-side model.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
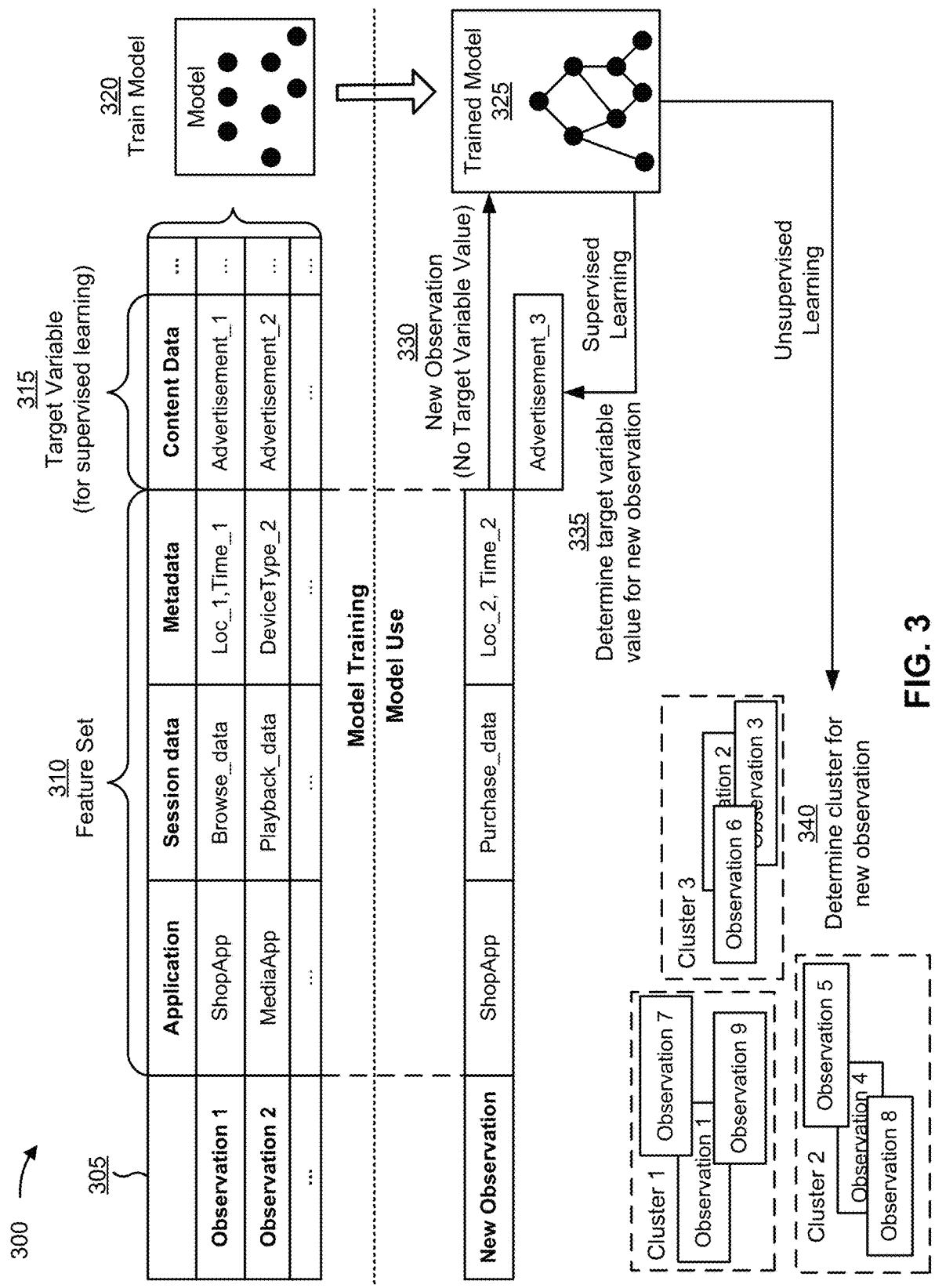
FIG. 3 is a diagram illustrating an example of training and using a machine learning model in connection with targeted content selection using a federated learning system.

FIG. 3 is a diagram illustrating an example 300 of training and using a machine learning model in connection with targeted content selection using a federated learning system. The machine learning model training and usage described herein may be performed using a machine learning system. The machine learning system may include or may be included in a computing device, a server, a cloud computing environment, and/or the like, such as the content management system described in more detail elsewhere herein.

As shown by reference number 305, a machine learning model may be trained using a set of observations. The set of observations may be obtained from historical data, such as data gathered during one or more processes described herein. In some implementations, the machine learning system may receive the set of observations (e.g., as input) from the content management system, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the content management system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of an application, a second feature of session data, a third feature of metadata, and so on. As shown, for a first observation, the first feature may have a value of ShopApp (e.g., information identifying an application associated with the observation), the second feature may have a value of Browse_data (e.g., cookies generated by the application), the third feature may have a value of Loc_1, Time_1 (e.g., a location and a time associated with the observation), and so on. These features and feature values are provided as examples and may differ in other examples.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 300, the target variable is Content Data, which has a value of Advertisement_1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of ShopApp, a second feature of purchase data, a third feature of Loc_2, Time_2, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 325 may predict a value of Advertisement_3 for the target variable of Content Data for the new observation, as shown by reference number 335. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, a recommendation to provide particular content (e.g., a particular advertisement) to a user. The first automated action may include, for example, automatically providing particular content to a user.

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., a cluster associated with providing a first advertisement), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to selecting targeted content to be provided to a user. The machine learning system enables recognition and/or identification of tens, hundreds, thousands, or millions of features and/or feature values for tens, hundreds, thousands, or millions of observations, thereby increasing accuracy and consistency and reducing delay associated with selected target content relative to requiring computing resources to be allocated for tens, hundreds, or thousands of operators to manually select targeted content using the features or feature values.

As indicated above, FIG. 3 is provided as an example. Other examples may differ from what is described in connection with FIG. 3.

Figure 4:
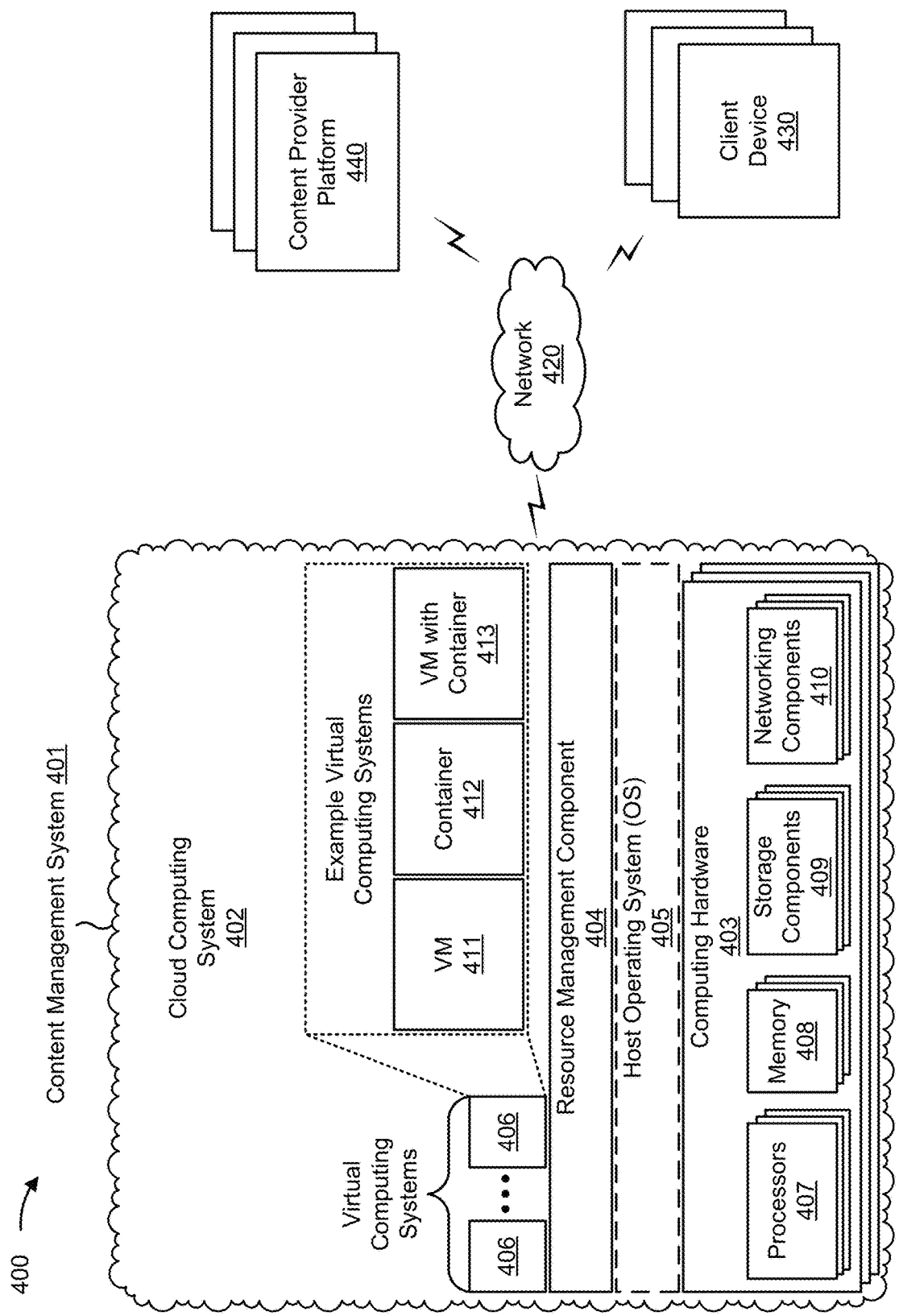
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a content management system 401, which may include one or more elements of and/or may execute within a cloud computing system 402. The cloud computing system 402 may include one or more elements 403-413, as described in more detail below. As further shown in FIG. 4, environment 400 may include a network 420, a client device 430, and/or a content provider platform 440. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications using a file system that includes binary files, software libraries, and/or other resources required to execute applications on a guest operating system (e.g., within the virtual computing system 406) or the host operating system 405.

Although the content management system 401 may include one or more elements 403-413 of the cloud computing system 402, the content management system 401 may execute within the cloud computing system 402, and/or may be hosted within the cloud computing system 402. In some implementations, the content management system 401 may not be cloud-based (e.g., may be implemented outside of a cloud computing system) or may be partially cloud-based. For example, the content management system 401 may include one or more devices that are not part of the cloud computing system 402, such as device 500 of FIG. 5, which may include a standalone server or another type of computing device. The content management system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

Client device 430 includes one or more devices capable of receiving, generating, storing, processing, and/or providing information associated with selecting targeted content, as described elsewhere herein. Client device 430 may include a communication device and/or a computing device. For example, the client device 430 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Client device 430 may communicate with one or more other devices of environment 400, as described elsewhere herein.

Content provider platform 440 may include one or more devices capable of receiving, generating, storing, processing, and/or providing content, as described elsewhere herein. Content provider platform 440 may include a communication device and/or a computing device. For example, content provider platform 440 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Content provider platform 440 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
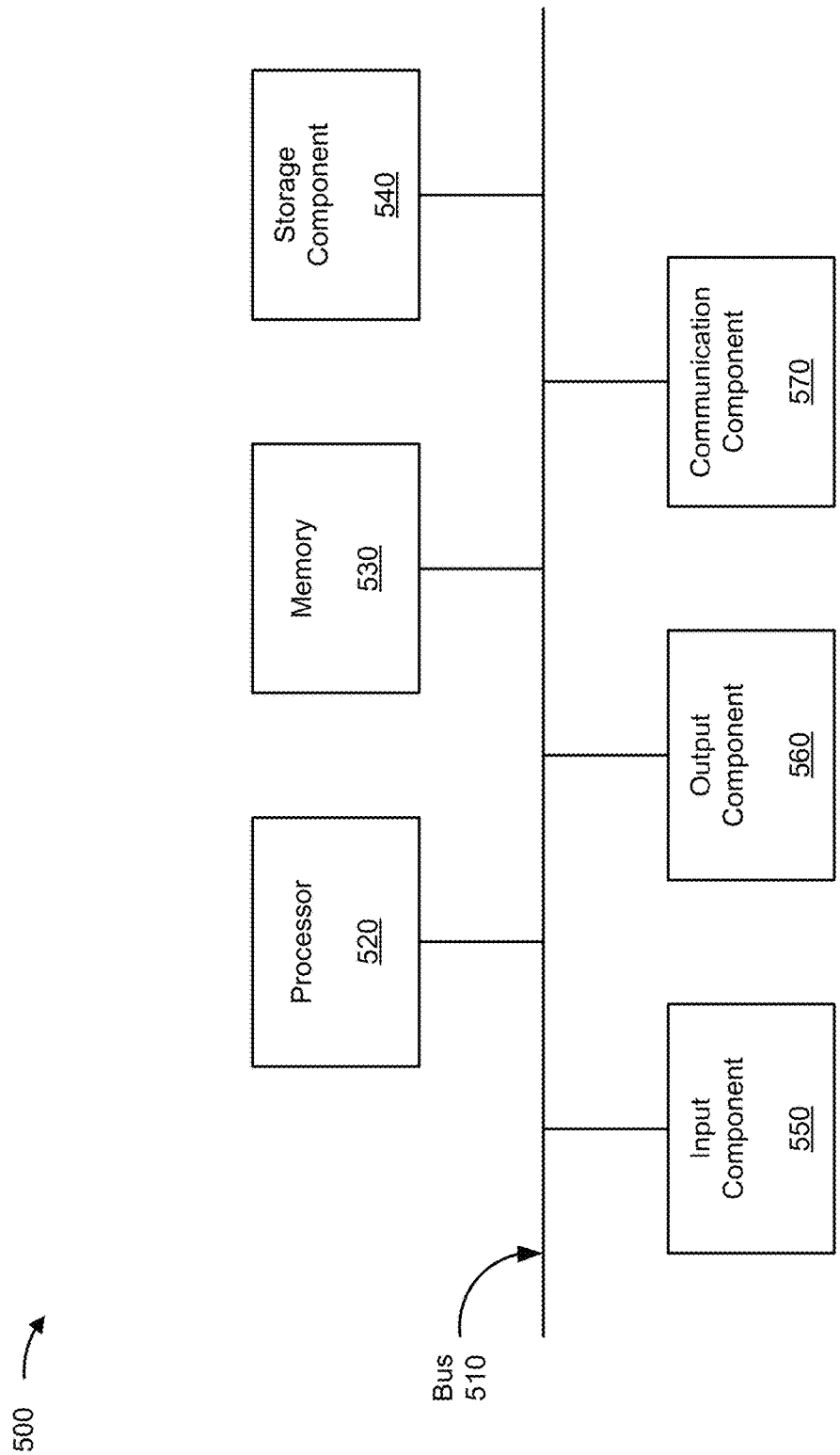
FIG. 5 is a diagram of example components of one or more devices of FIG. 4.

FIG. 5 is a diagram of example components of a device 500, which may correspond to content management system 401, client device 430, and/or content provider platform 440. In some implementations, content management system 401, client device 430, and/or content provider platform 440 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, an actuator, and/or the like. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, an antenna, and/or the like.

Device 500 may perform one or more processes described herein. For example, a non-transitory computer-readable medium (e.g., memory 530 and/or storage component 540) may store a set of instructions (e.g., one or more instructions, code, software code, program code, and/or the like) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
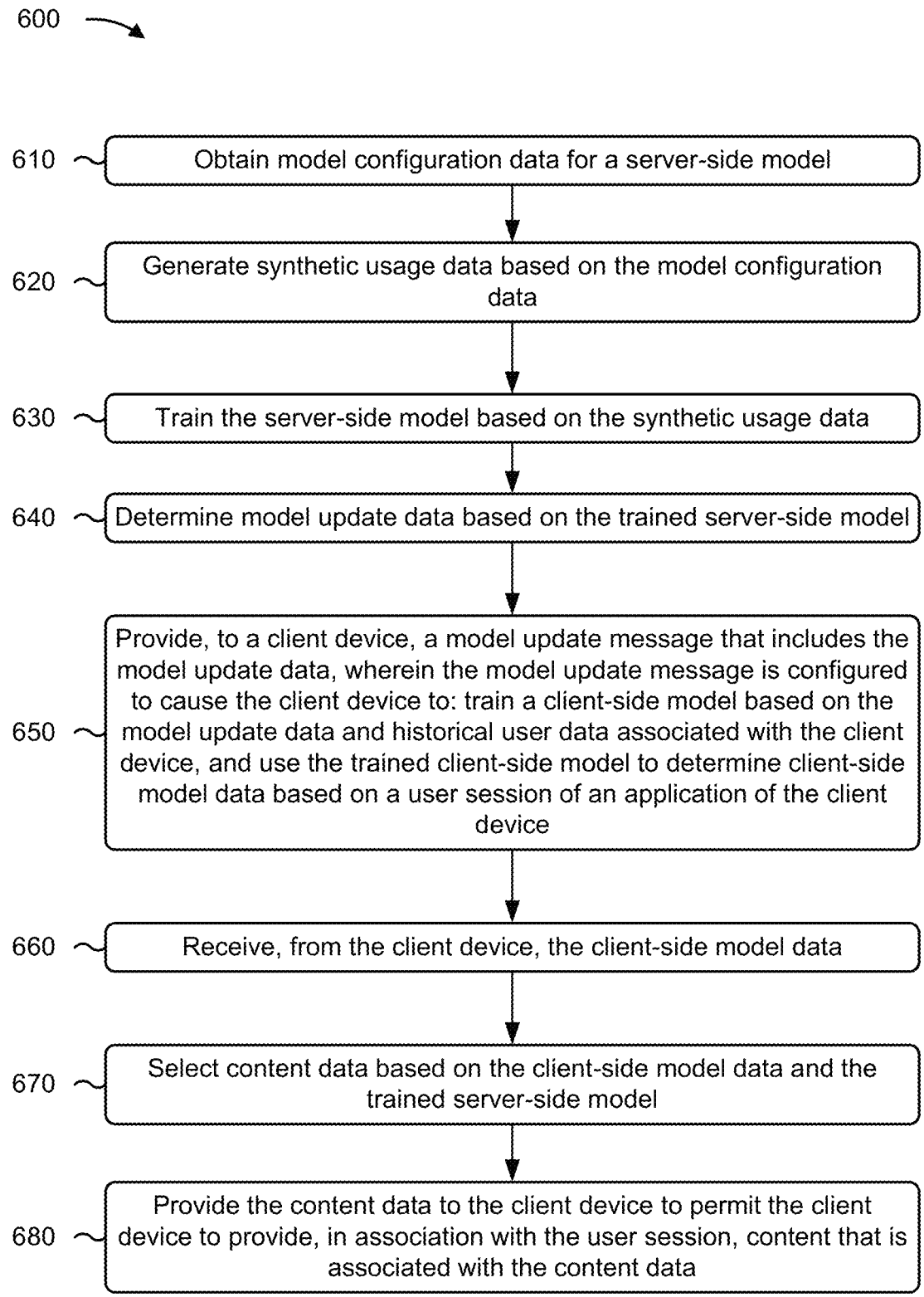
FIGS. 6 and 7 are flowcharts of example processes relating to targeted content selection using a federated learning system.

FIG. 6 is a flowchart of an example process 600 associated with targeted content selection using a federated learning system. In some implementations, one or more process blocks of FIG. 6 may be performed by a server device (e.g., content management system 401). In some implementations, one or more process blocks of FIG. 6 may be performed by another device or a group of devices separate from or including the server device, such as a client device (e.g., client device 430) and/or a content provider platform (e.g., content provider platform 440). Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include obtaining model configuration data for a server-side model (block 610). For example, the server device may obtain model configuration data for a server-side model, as described above. The model configuration data may comprise user exception testing data.

As further shown in FIG. 6, process 600 may include generating synthetic usage data based on the model configuration data (block 620). For example, the server device may generate synthetic usage data based on the model configuration data, as described above. The model configuration data may include historical usage data associated with the application. The synthetic usage data is generated from one or more simulated user sessions associated with the application that are based on the historical usage data. In some implementations, the model configuration data includes historical usage data that is associated with the application and one or more other applications and the synthetic usage data is generated from one or more simulated user sessions that are based on the historical usage data. The one or more simulated user sessions may be associated with at least one of the application or the one or more other applications.

As further shown in FIG. 6, process 600 may include training the server-side model based on the synthetic usage data (block 630). For example, the server device may train the server-side model based on the synthetic usage data, as described above.

As further shown in FIG. 6, process 600 may include determining model update data based on the trained server-side model (block 640). For example, the server device may determine model update data based on the trained server-side model, as described above.

As further shown in FIG. 6, process 600 may include providing, to a client device, a model update message that includes the model update data, wherein the model update message is configured to cause the client device to: train a client-side model based on the model update data and historical user data associated with the client device, and use the trained client-side model to determine client-side model data based on a user session of an application of the client device (block 650). For example, the server device may provide, to a client device, a model update message that includes the model update data. The model update message may be configured to cause the client device to train a client-side model based on the model update data and historical user data associated with the client device, and use the trained client-side model to determine client-side model data based on a user session of an application of the client device, as described above. The client-side model may comprise a mixture of experts model.

In some implementations, the model update message is configured to cause the client device to: train a client-side model based on the model update data and historical user data associated with the client device, and use the trained client-side model to determine client-side model data based on a user session of an application of the client device. The client-side model may be specifically configured for the application, and the model update message may identify the application to cause the client device to select the client-side model to train the client-side model.

As further shown in FIG. 6, process 600 may include receiving, from the client device, the client-side model data (block 660). For example, the server device may receive, from the client device, the client-side model data, as described above. The client-side model data may comprise weight setting of a machine learning model that are generated from training the client-side model. The weight settings and the synthetic usage data may be used as inputs to the trained server-side model to select the content data. The weight settings may be used as corresponding settings of the server-side model to permit the server-side model to select the content data based on synthetic usage data associated with one or more simulated user sessions of the application. Alternatively, and/or additionally, the client-side model data may comprise user behavior pattern data.

In some implementations, the client device may provide the client-side model data based on receiving model configuration data associated with training the server-side model and/or receiving updated session data associated with one or more other user sessions of the application. Alternatively, and/or additionally, the client-side model data may be obtained based on receiving, from the client device, a content request for the user session.

As further shown in FIG. 6, process 600 may include selecting content data based on the client-side model data and the trained server-side model (block 670). For example, the server device may select content data based on the client-side model data and the trained server-side model, as described above. The server-side model may be specifically configured for the application, and the content data may be selected from sets of content data that are received from a content provider. The content data may be configured to be provided, by the server, to one or more client devices based on session data associated with user sessions of the one or more client devices, without the content provider receiving the session data.

In some implementations, the content data is selected from sets of content data that are received from content providers that are subscribed to a service associated with the server device providing one or more of the sets of content data based on the session data, without the content providers receiving the session data.

As further shown in FIG. 6, process 600 may include providing the content data to the client device to permit the client device to provide, in association with the user session, content that is associated with the content data (block 680). For example, the server device may provide the content data to the client device to permit the client device to provide, in association with the user session, content that is associated with the content data, as described above.

In some implementations, the server device may retrain the server-side model based on the synthetic usage data and the client-side model data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
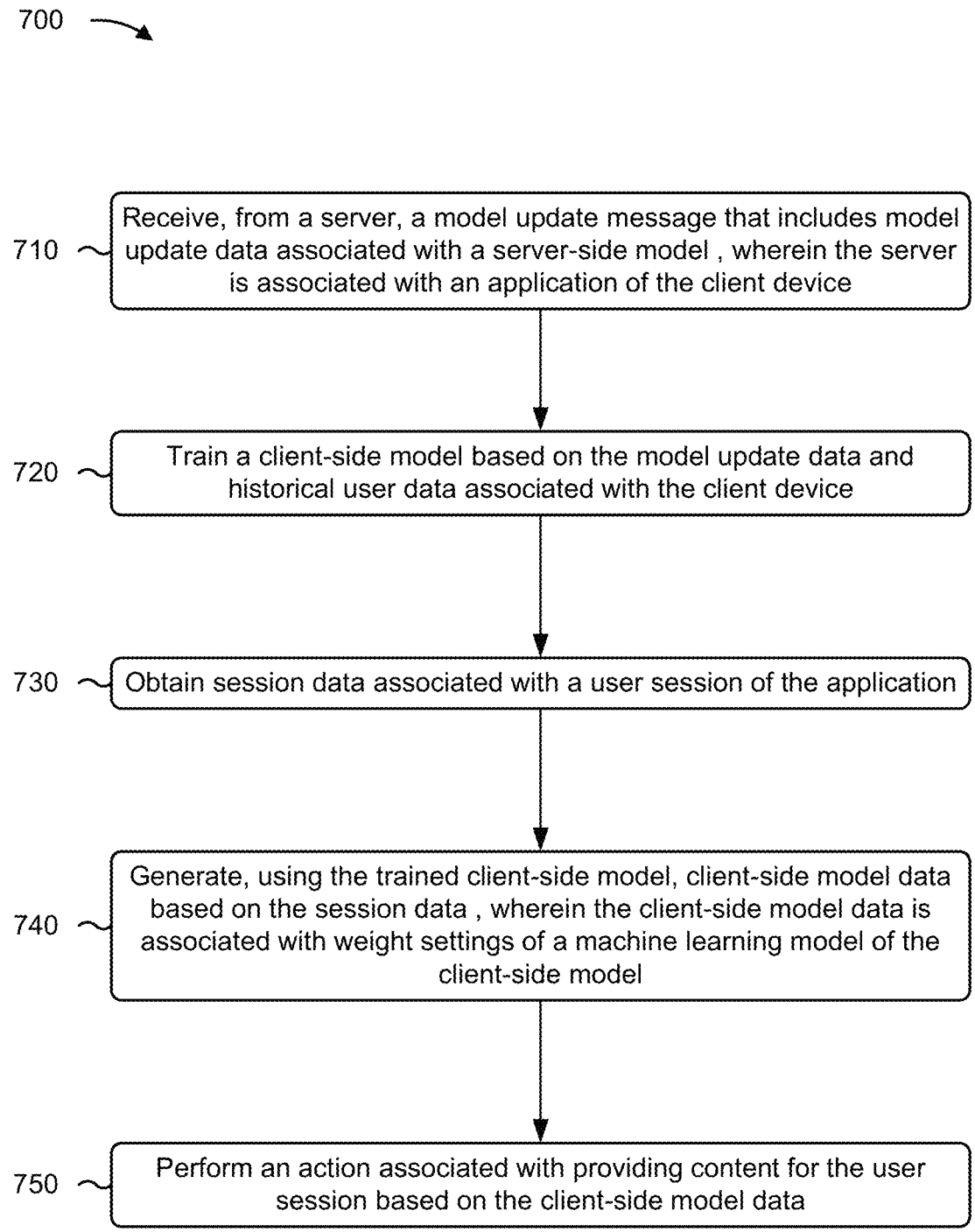

FIG. 7 is a flowchart of an example process 700 associated with targeted content selection using a federated learning system. In some implementations, one or more process blocks of FIG. 7 may be performed by a client device (e.g., client device 430). In some implementations, one or more process blocks of FIG. 7 may be performed by another device or a group of devices separate from or including the client device, such as a content management system (e.g., content management system 401) and/or a content provider platform (e.g., content provider platform 440). Additionally, or alternatively, one or more process blocks of FIG. 7 may be performed by one or more components of device 500, such as processor 520, memory 530, storage component 540, input component 550, output component 560, and/or communication component 570.

As shown in FIG. 7, process 700 may include receiving, from a server, a model update message that includes model update data associated with a server-side model, wherein the server is associated with an application of the client device (block 710). For example, the client device may receive, from a server, a model update message that includes model update data associated with a server-side model, as described above. The server may be associated with an application of the client device. In some implementations, prior to receiving the model update message, the client device may send, to the server, a content request associated with causing the server to provide the content.

As further shown in FIG. 7, process 700 may include training a client-side model based on the model update data and historical user data associated with the client device (block 720). For example, the client device may train a client-side model based on the model update data and historical user data associated with the client device, as described above. The model update data may include weight settings associated with the server-side model that are generated from training the server-side model. The client-side model data may be trained by configuring the client-side model according to the weight settings and inputting the historical user data to generate the trained client-side model.

As further shown in FIG. 7, process 700 may include obtaining session data associated with a user session of the application (block 730). For example, the client device may obtain session data associated with a user session of the application, as described above.

As further shown in FIG. 7, process 700 may include generating, using the trained client-side model, client-side model data based on the session data, wherein the client-side model data is associated with weight settings of a machine learning model of the client-side model (block 740). For example, the client device may generate, using the trained client-side model, client-side model data based on the session data, wherein the client-side model data is associated with weight settings of a machine learning model of the client-side model, as described above. In some implementations, the client-side model data is associated with weight settings of a machine learning model of the client-side model.

In some implementations, the client device may determine, using a prediction model, a confidence score associated with the client-side model data. The client device may select, from a set of models that includes the trained client-side model and the server-side model, the trained client-side model to select the content based on the confidence score satisfying a threshold associated with the client-side model being configured to select the content. The client device may cause a user interface of the client device to provide the content.

In some implementations, the client device may select the server-side model to select the content based on the confidence score satisfying a threshold associated with the client-side model being unable to select the content. The client device may transmit the client-side model data to the server to cause the server to provide content data based on the client-side model data and the server-side model. The client device may receive the content data from the server, and causing a user interface of the client device to provide the content based on receiving the content data.

In some implementations, prior to generating the client-side model data, the client device may obtain metadata associated with the client device. The client-side model data may be generated based on inputting the session data and the metadata into the trained client-side model.

As further shown in FIG. 7, process 700 may include performing an action associated with providing content for the user session based on the client-side model data (block 750). For example, the client device may perform an action associated with providing content for the user session based on the client-side model data, as described above. In some implementations, performing the action may include selecting, based on the client-side model data, content data, associated with the content, from sets of content data identified in the model update data, and providing the content via a user interface of the client device.

In some implementations, performing the action includes, without providing the session data to the server, transmitting the client-side model data to the server to cause the server to provide content data based on the weight settings and the server-side model, receiving the content data from the server, and providing, based on receiving the content, the content via a user interface of the client device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a server maintaining a server-side model, model configuration data for the server-side model,
      wherein the model configuration data includes information associated with actions performed by a user while accessing an application of a client device associated with the server-side model;
   generating, by the server and based on the model configuration data, synthetic usage data to simulate the user performing the actions while accessing the application, wherein generating the synthetic usage data comprises:
identifying a series of steps performed by the user while using the application, and
generating the synthetic usage data based on the series of steps;
training, by the server, the server-side model based on the synthetic usage data and to generate a trained server-side model;
determining, by the server, model update data based on the trained server-side model;
providing, by the server and to the client device, a model update message that includes the model update data,
wherein the model update message is configured to cause the client device to:
train, based on the model update data and historical user data associated with the client device, a client-side model, maintained by the client device and associated with the server-side model, to generate a trained client-side model,
obtain metadata associated with the client device, and
use the trained client-side model to determine client-side model data based on a user session of the application,
wherein the client-side model data is determined based on inputting session data associated with the user session of the client device and the metadata into the trained client-side model;
receiving, by the server and from the client device, the client-side model data;
selecting, by the server, content data based on the client-side model data and the trained server-side model; and
providing, by the server, the content data to the client device to permit the client device to provide, in association with the user session, content that is associated with the content data.

2. The method of claim 1, wherein the model configuration data includes historical usage data associated with the application, and
wherein the synthetic usage data is generated from one or more simulated user sessions associated with the application that are based on the historical usage data.

3. The method of claim 1, wherein the model configuration data includes historical usage data that is associated with the application and one or more other applications,
wherein the synthetic usage data is generated from one or more simulated user sessions that are based on the historical usage data,
wherein the one or more simulated user sessions are associated with at least one of the application or the one or more other applications.

4. The method of claim 1, wherein the client-side model is specifically configured for the application, and
wherein the model update message identifies the application to cause the client device to select the client-side model to train the client-side model.

5. The method of claim 1, wherein the server-side model is specifically configured for the application, and
wherein the content data is selected from sets of content data that are received from a content provider,
wherein the content data is configured to be provided, by the server, to one or more client devices based on session data associated with user sessions of the one or more client devices, without the content provider receiving the session data.

6. The method of claim 1, wherein the client-side model data comprises weight settings of a machine learning model that are generated from training the client-side model,
wherein the weight settings and the synthetic usage data are used as inputs to the trained server-side model to select the content data.

7. The method of claim 1, further comprising:
retraining the trained server-side model based on the synthetic usage data and the client-side model data.

8. A client device, comprising:
one or more memories; and
one or more processors, communicatively coupled to the one or more memories, configured to:
receive, from a server maintaining a server-side model, a model update message that includes model update data associated with the server-side model,
wherein the server is associated with an application of the client device, and
wherein the server-side model is trained based on synthetic usage data that simulates a user performing actions while accessing the application,
wherein the synthetic usage data is generated based on a series of steps performed by the user while using the application;
train, based on the model update data and historical user data associated with the client device, a client-side model, maintained by the client device and associated with server-side model, to generate a trained client-side model;
obtain session data associated with a user session of the application;
obtain metadata associated with the client device;
generate, using the trained client-side model, client-side model data based on the session data,
wherein the client-side model data is associated with weight settings of a machine learning model of the client-side model, and
wherein the client-side model data is generated based on inputting the session data and the metadata into the trained client-side model; and
perform an action associated with providing content for the user session based on the client-side model data.

9. The client device of claim 8, wherein the model update data includes weight settings associated with the server-side model that are generated from training the server-side model,
wherein the client-side model data is trained by:
configuring the client-side model according to the weight settings, and
inputting the historical user data to generate the trained client-side model.

10. The client device of claim 8, wherein the one or more processors are further configured to:
prior to receiving the model update message, send, to the server, a content request associated with causing the server to provide the content.

11. The client device of claim 8, wherein the one or more processors, when performing the action, are configured to:
determine, using a prediction model, a confidence score associated with the client-side model data;
select, from a set of models that includes the trained client-side model and the server-side model, the trained client-side model to select the content based on the confidence score satisfying a threshold associated with the client-side model being configured to select the content; and cause a user interface of the client device to provide the content.

12. The client device of claim 8, wherein the one or more processors, when performing the action, are configured to:
determine, using a prediction model, a confidence score associated with the client-side model data;
select, from a set of models that includes the trained client-side model and the server-side model, the server-side model to select the content based on the confidence score satisfying a threshold associated with the client-side model being unable to select the content; and
transmit the client-side model data to the server to cause the server to provide content data based on the client-side model data and the server-side model;
receive the content data from the server; and
cause a user interface of the client device to provide the content based on receiving the content data.

13. The client device of claim 8, wherein the one or more processors, when performing the action, are configured to:
select, based on the client-side model data, content data, associated with the content, from sets of content data identified in the model update data; and
provide the content via a user interface of the client device.

14. The client device of claim 8, wherein the one or more processors, when performing the action, are configured to:
without providing the session data to the server, transmit the client-side model data to the server to cause the server to provide content data based on the weight settings and the server-side model;
receive the content data from the server; and
provide, based on receiving the content, the content via a user interface of the client device.

15. A non-transitory computer-readable medium storing a set of instructions, the set of instructions comprising:
one or more instructions that, when executed by one or more processors of a server, cause the server to:
obtain model update data associated with a server-side model maintained by the server,
wherein the server-side model is trained based on synthetic usage data that simulates a user performing actions while accessing an application of a client device,
wherein the synthetic usage data is generated based on a series of steps performed by the user while using the application;
provide the model update data to the client device,
wherein the model update data is configured to cause the client device to:
train, based on the model update data and historical user data associated with the client device, a client-side model, maintained by the client device and associated with the server-side model, to generate a trained client-side model, and
use the trained client-side model to determine client-side model data based on session data associated with a user session associated with the application;
obtain metadata associated with the client device;
receive, from the client device, the client-side model data,
wherein the client-side model data is associated with weight settings of a machine learning model of the client-side model, and
wherein the client-side model data is generated based on inputting the session data and the metadata into the trained client-side model;
select content data for the user session based on the weight settings and the server-side model; and
provide the content data to the client device to permit the client device to output content that is associated with the content data.

16. The method of claim 1, wherein the model update data is obtained based on at least one of:
receiving model configuration data associated with training the server-side model;
receiving updated session data associated with one or more other user sessions of the application; or
receiving, from the client device, a content request for the user session.

17. The non-transitory computer-readable medium of claim 16, wherein the server-side model is specifically configured for the application, and
wherein the content data is selected from sets of content data that are received from content providers that are subscribed to a service associated with the server providing one or more of the sets of content data based on the session data, without the content providers receiving the session data.

18. The non-transitory computer-readable medium of claim 16, wherein the weight settings are used as corresponding settings of the server-side model to permit the server-side model to select the content data based on the synthetic usage data associated with one or more simulated user sessions of the application.

19. The non-transitory computer-readable medium of claim 16, wherein the one or more instructions further cause the server to:
train the server-side model based on the client-side model data and the synthetic usage data associated with the application.

20. A server device, comprising:
one or more memories; and
one or more processors, communicatively coupled to the one or more memories, configured to:
obtain model configuration data for a server-side model maintained by the server device,
wherein the model configuration data includes information associated with actions performed by a user while accessing an application of a client device associated with the server-side model;
generate synthetic usage data based on the model configuration data to simulate the user performing the actions while accessing the application,
wherein generating the synthetic usage data comprises:
identifying a series of steps performed by the user while using the application, and
generating the synthetic usage data based on the series of steps;
train the server-side model based on the synthetic usage data and to generate a trained server-side model;
determine model update data based on the trained server-side model;
provide, to the client device, a model update message that includes the model update data,
wherein the model update message is configured to cause the client device to:
train, based on the model update data and historical user data associated with the client device, a client-side model, maintained by the client device and associated with the server-side model, to generate a trained client-side model,
obtain metadata associated with the client device, and use the trained client-side model to determine client-side model data based on a user session of the application,
wherein the client-side model data is generated based on inputting session data associated with the user session of the client device and the metadata into the trained client-side model;
receive, from the client device, the client-side model data;
select content data based on the client-side model data and the trained server-side model; and
provide the content data to the client device to permit the client device to provide, in association with the user session, content that is associated with the content data.

21. The server device of claim 20, wherein the model configuration data comprises user exception testing data.

22. The server device of claim 20, wherein the client-side model comprises a mixture of experts model.

23. The server device of claim 20, wherein the client-side model data comprises user behavior pattern data.

24. The server device of claim 20, wherein the synthetic usage data is generated from one or more simulated user sessions associated with the application that are based on historical usage data.

* * * * *